(12) United States Patent
Nakata et al.

(10) Patent No.: US 9,656,579 B2
(45) Date of Patent: May 23, 2017

(54) HEADREST AND VEHICLE SEAT

(71) Applicant: NHK SPRING CO., LTD., Yokohama-shi (JP)

(72) Inventors: Shinichi Nakata, Yokohama (JP); Tomohiro Hirose, Yokohama (JP); Masaharu Sanpei, Tokyo (JP)

(73) Assignee: NHK SPRING CO., LTD., Yokohama-shi (JP)

( * ) Notice: Subject to any disclaimer, the term of this patent is extended or adjusted under 35 U.S.C. 154(b) by 0 days.

(21) Appl. No.: 14/505,748

(22) Filed: Oct. 3, 2014

(65) Prior Publication Data
US 2015/0097408 A1    Apr. 9, 2015

(30) Foreign Application Priority Data

Oct. 4, 2013   (JP) .................................. 2013-209394

(51) Int. Cl.
*A47C 7/62*    (2006.01)
*B60N 2/48*    (2006.01)

(52) U.S. Cl.
CPC ........ *B60N 2/48* (2013.01); *B60N 2002/4888* (2013.01)

(58) Field of Classification Search
CPC ............................ B60D 11/00151; B60N 3/00
USPC ......................................... 297/188.04, 217.3
See application file for complete search history.

(56) References Cited

U.S. PATENT DOCUMENTS

| | | | | |
|---|---|---|---|---|
| 5,529,265 A | * | 6/1996 | Sakurai .............. | B64D 11/0015 244/118.5 |
| 6,669,285 B1 | * | 12/2003 | Park ..................... | B60N 2/4876 297/217.3 |
| 6,883,870 B2 | * | 4/2005 | Jost ....................... | B60N 2/4808 297/217.3 |
| 7,040,697 B1 | * | 5/2006 | Tuccinardi .......... | B60R 11/0235 297/188.04 |
| 7,044,546 B2 | * | 5/2006 | Chang ................. | B60R 11/0235 297/217.3 |
| 7,448,679 B2 | * | 11/2008 | Chang ................. | B60R 11/0235 297/217.3 |
| 7,597,393 B1 | * | 10/2009 | Tuccinardi .......... | B60R 11/0211 297/188.04 |

(Continued)

FOREIGN PATENT DOCUMENTS

| | | |
|---|---|---|
| JP | 2004-081385 A | 3/2004 |
| JP | 2004-529688 | 9/2004 |

(Continued)

OTHER PUBLICATIONS

Notice of Reasons for Rejection to corresponding Japanese Application 2013-209394 mailed Aug. 26, 2014.

*Primary Examiner* — David R Dunn
*Assistant Examiner* — Alexander Harrison
(74) *Attorney, Agent, or Firm* — Knobbe Martens Olson & Bear LLP

(57) ABSTRACT

A headrest comprising a pad member that includes a recess shaped housing portion open to a rear side when the headrest is assembled to a vehicle seat and that is a resilient body that supports the head of an occupant; and an attachment member that has a portion housed in the housing portion, that is formed with an opening portion for attaching a display device to, and that further has an outer peripheral portion of the opening portion that is disposed further to the rear side than the pad member.

5 Claims, 9 Drawing Sheets

(56) References Cited

U.S. PATENT DOCUMENTS

| | | | |
|---|---|---|---|
| 7,636,930 B2 * | 12/2009 | Chang | B60R 11/0235 |
| | | | 348/837 |
| 8,292,364 B2 * | 10/2012 | Liu | B60N 2/4876 |
| | | | 297/217.3 |
| 2006/0119151 A1 * | 6/2006 | Vitito | B60K 35/00 |
| | | | 297/217.3 |
| 2006/0175879 A1 * | 8/2006 | Chiang | B60R 11/0235 |
| | | | 297/188.04 |
| 2008/0185886 A1 * | 8/2008 | Li | B60N 2/4876 |
| | | | 297/217.3 |
| 2008/0203788 A1 * | 8/2008 | Hattori | B60N 2/4876 |
| | | | 297/217.3 |
| 2012/0280542 A1 * | 11/2012 | Wood | B60R 11/0235 |
| | | | 297/180.1 |

FOREIGN PATENT DOCUMENTS

| | | |
|---|---|---|
| JP | 2005-343328 A | 12/2005 |
| WO | WO 2007/108271 A1 | 9/2007 |

* cited by examiner

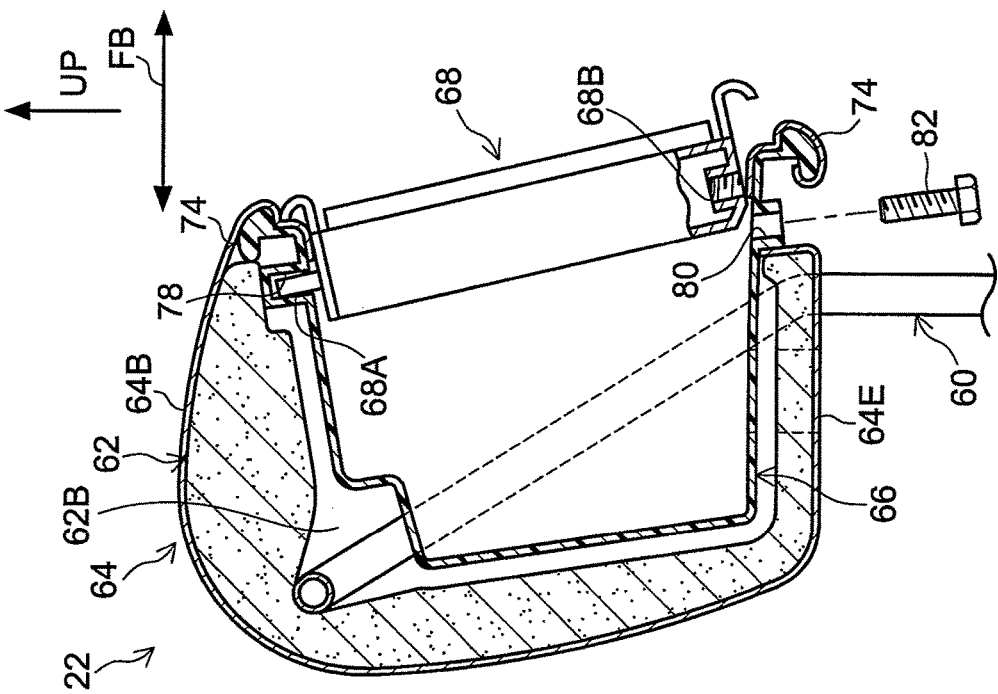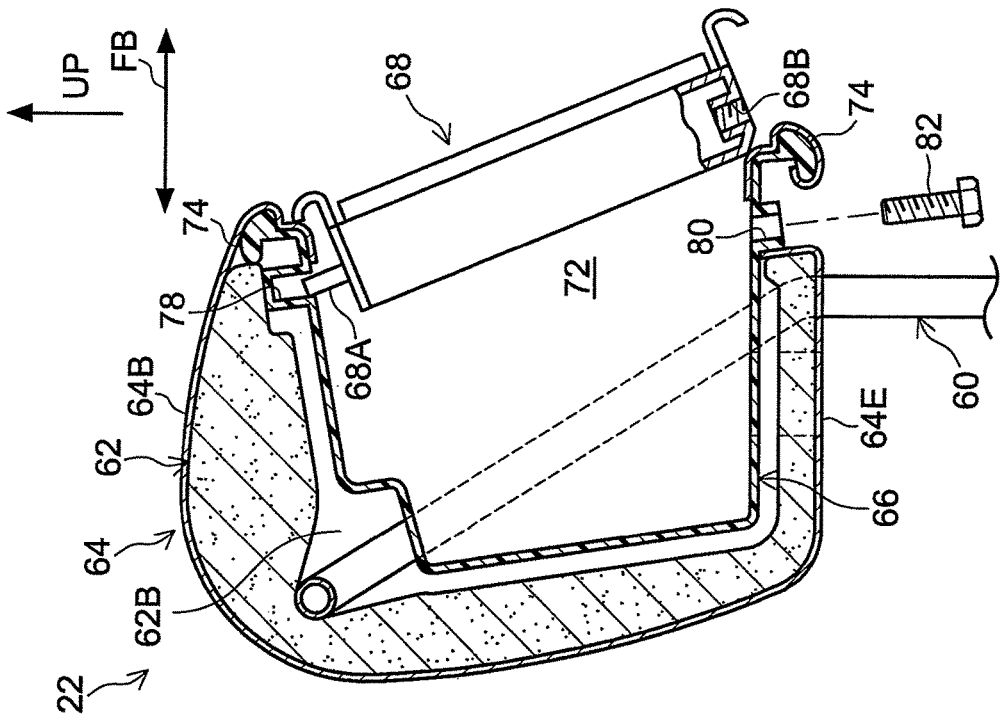

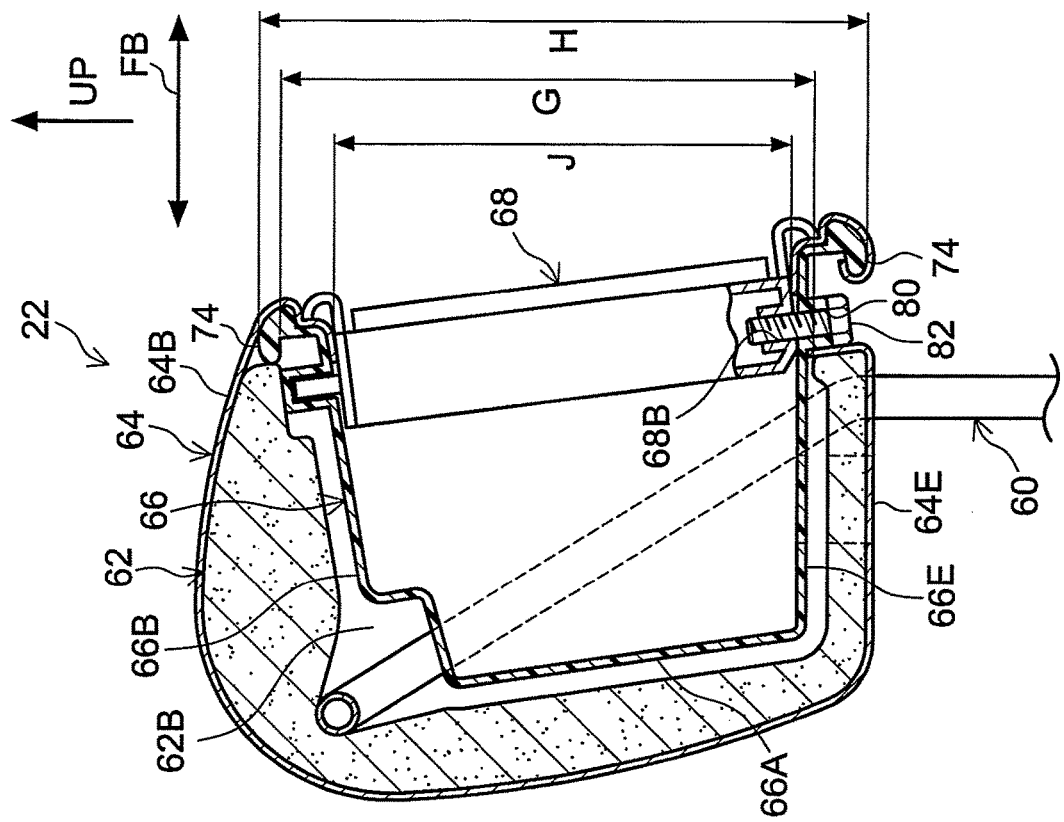
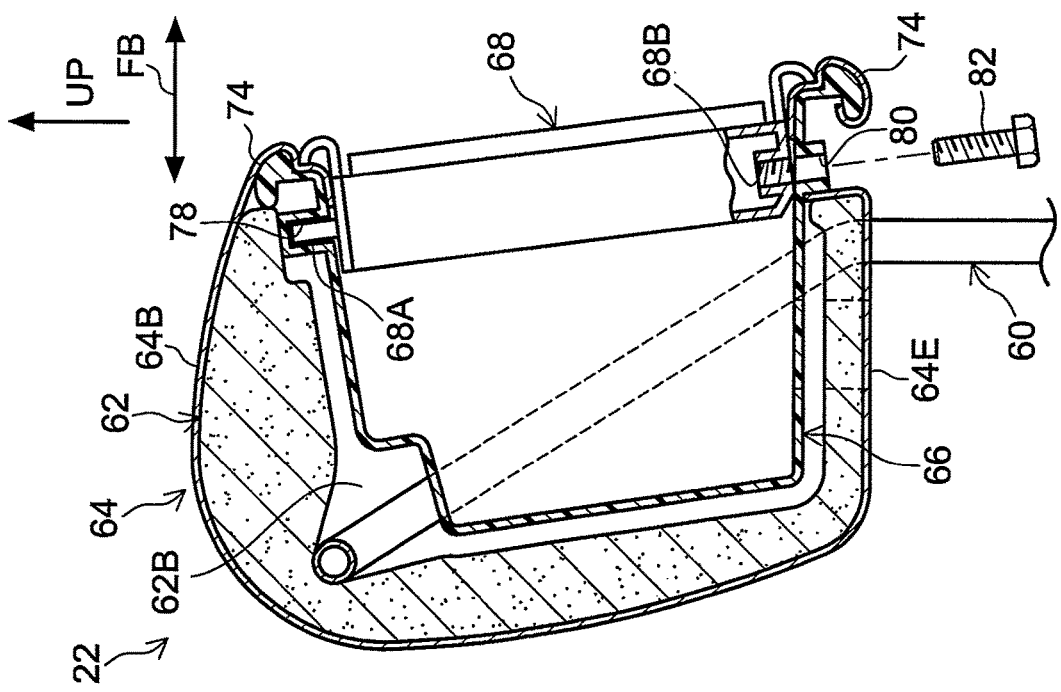

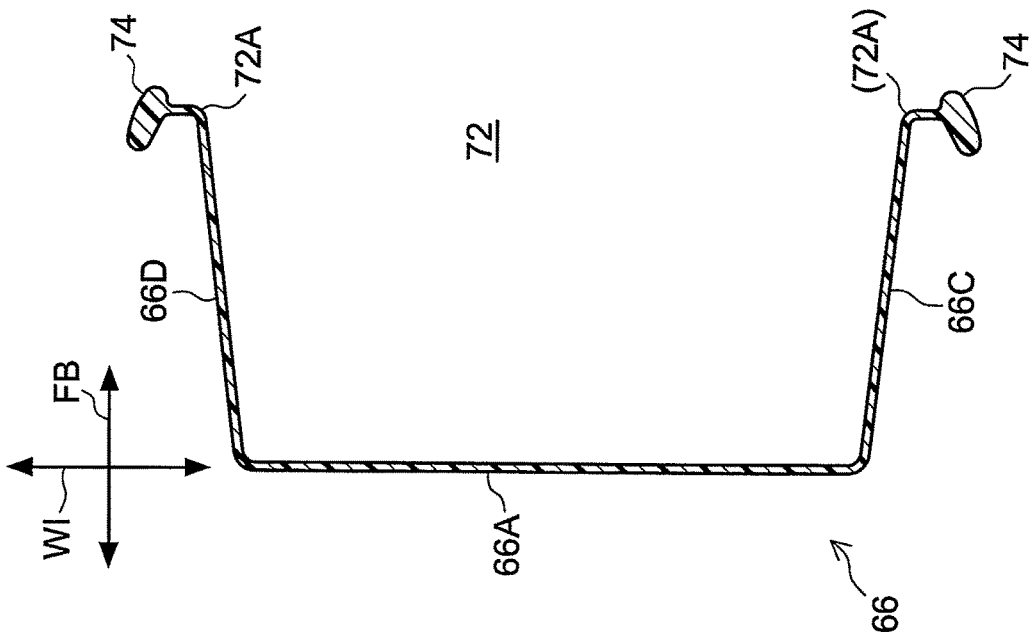
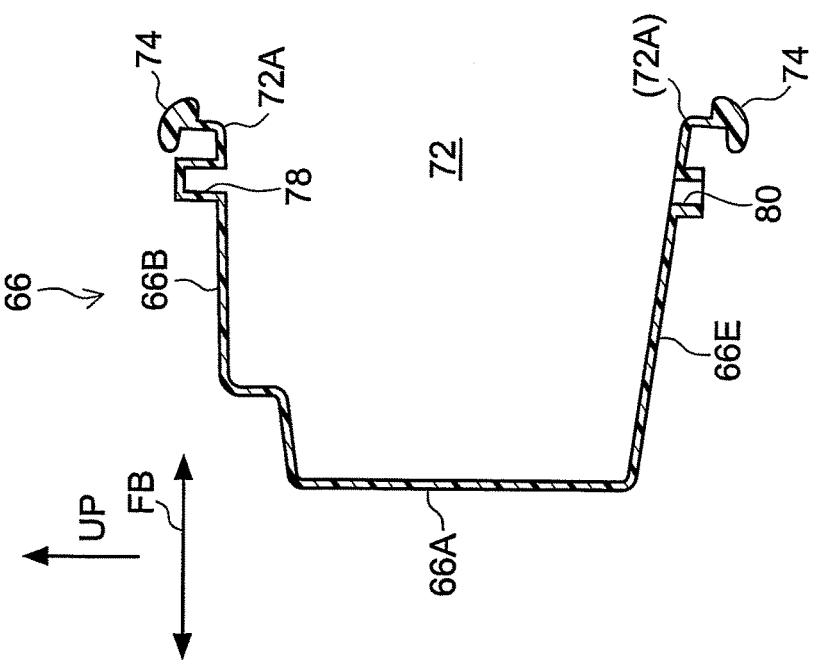

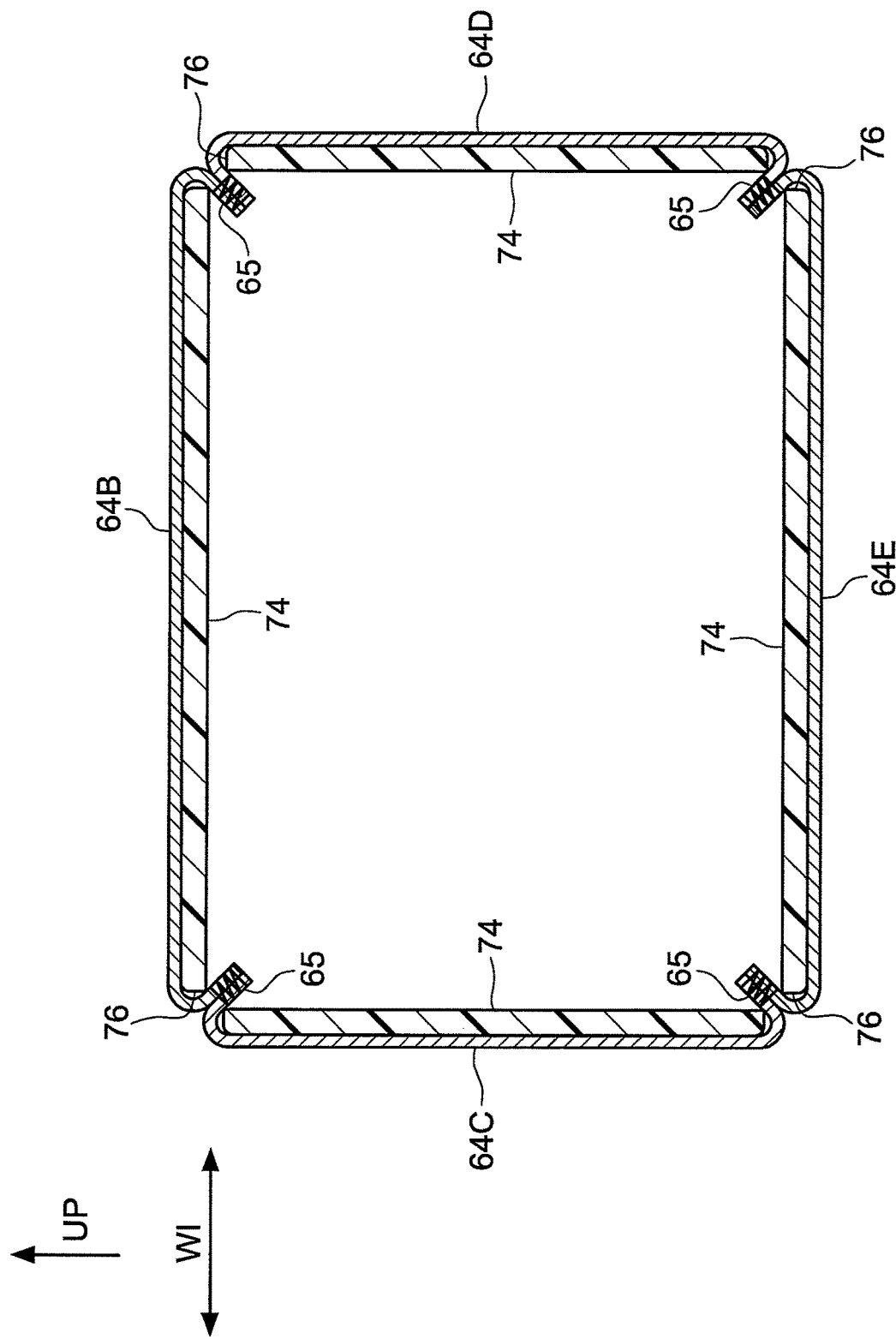

HEADREST AND VEHICLE SEAT

CROSS-REFERENCE TO RELATED APPLICATION

This application claims priority under 35 USC 119 from Japanese Patent Application, No. 2013-209394 filed Oct. 4, 2013, the disclosure of which is incorporated by reference herein.

BACKGROUND OF THE INVENTION

Technical Field

The present invention relates to a headrest and a vehicle seat.

Related Art

Japanese Patent Application Laid-Open (JP-A) No. 2005-343328 describes a configuration in which a display device is mounted to a headrest of a vehicle seat.

In such a configuration, a recessed portion into which an inner case is inserted is formed to a rear face of the headrest, and the display device is attached inside the inner case inserted into and attached to the recessed portion. Namely, the entire inner case (attachment member) to which the display device is attached is surrounded by the headrest (pad member).

SUMMARY

However, in a configuration in which the entire attachment member to which the display device is attached is surrounded by the pad member, the attachment member is smaller than the pad member, and the size of the display device attached to the attachment member is also reduced as a result.

A subject of the present invention is to obtain a configuration that enables a large display device to be attached to a headrest.

A headrest of a first aspect of the present invention includes a pad member including a recess shaped housing portion open to a rear side when the headrest is assembled to a vehicle seat, the pad member being a resilient body that supports the head of an occupant, and an attachment member including a portion housed in the housing portion, being formed with an opening portion for attaching a display device to and further including an outer peripheral portion of the opening portion disposed further to the rear side than the pad member.

In the above configuration, a display device is attachable to the opening portion of the attachment member, and the outer peripheral portion of the opening portion is disposed further to the rear side than the pad member. This enables the dimension of the outer peripheral portion of the opening portion to be increased in size, compared to a case in which the attachment member is entirely housed in a housing portion of the pad member.

Since this also enables the opening portion to be increased in size, a configuration can be obtained in which a large display device is attachable to the headrest.

A headrest of a second aspect of the present invention is the headrest of the first aspect, further including a covering member that covers the pad member, and wherein the outer peripheral portion is a folded-over portion that is folded over from an edge configuring the opening portion of the attachment member, and that supports a portion of the covering member at the folded-over portion.

In the above configuration, a portion of the covering member is supported by a folded-over portion that is folded over from an edge configuring the opening portion of the attachment member. The folded-over portion, that improves the rigidity of the opening portion, is used to support a portion of the covering member thereby enabling an increase in the number of components to be suppressed.

The headrest of a third aspect of the invention is the headrest of either the first or the second aspect, wherein: the attachment member is formed in a box shape open at the opening portion, and includes a bottom plate, an upper plate with a plate face facing upward, one side plate with a plate face facing one side, another side plate with a plate face facing the other side, and a lower plate with a plate face facing downward; the attachment member is formed with a cutout that enables flexing of the lower plate. The upper plate is formed with an engaged portion that is engaged by an engagement portion formed to an upper portion of the display device and the lower plate is formed with a communication hole that is in communication with an attachment hole formed to a lower portion of the display device.

In the above configuration, since a cutout is formed that enables the lower plate to flex, the lower plate flexes when the display device is attached to the opening portion, thereby enabling easy attachment of the display device to the opening portion of the attachment member.

The headrest of a fourth aspect of the present invention is the headrest of a third aspect, wherein the cutout is respectively formed to a corner portion formed by the one side plate and the lower plate, and a corner portion formed by the other side plate and the lower plate.

In the above configuration, the cutouts formed at the corner portions enable the lower plate to be easily flexed.

A vehicle seat of a fifth aspect of the present invention includes a frame that is a support body, a seatback that supports the back of an occupant and that is attached to the frame, the headrest of any one of the first to the fourth aspect that supports the head of the occupant and that is attached to the frame, and a seat cushion that supports the buttocks of the occupant and that is attached to the frame.

In the above configuration, the headrest of the first to the fourth aspect is provided to support the head of an occupant, thereby enabling a configuration to be obtained in which a large display device is attachable to the seat.

The present invention enables a configuration to be obtained in which a large display device is attachable to a headrest.

BRIEF DESCRIPTION OF THE DRAWINGS

Embodiments of the present invention will be described in detail based on the following figures, wherein:

FIG. 1A to FIG. 2B are cross-sections respectively illustrating a headrest according to an exemplary embodiment of the present invention;

FIG. 3A and FIG. 3B are cross-sections illustrating a box employed in a headrest according to an exemplary embodiment of the present invention;

FIG. 4 is a cross-section illustrating a box employed in a headrest according to an exemplary embodiment of the present invention;

DETAILED DESCRIPTION OF THE INVENTION

Figure 5:
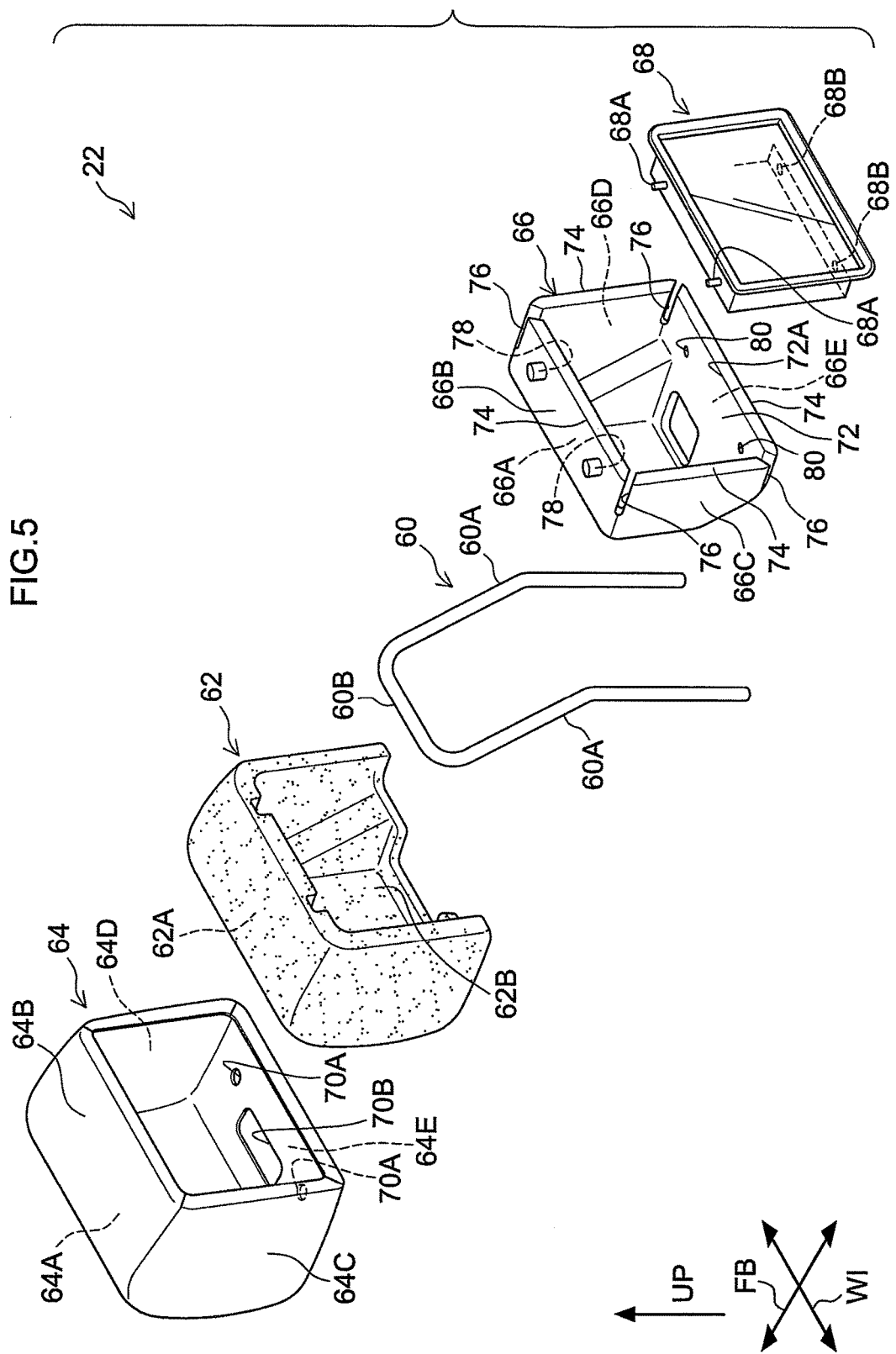
FIG. 5 is an exploded perspective view illustrating a headrest according to an exemplary embodiment of the present invention.

Explanation follows regarding an example of a headrest and a vehicle seat according to an exemplary embodiment of the present invention, with reference to FIG. 1 to FIG. 9. Note that in the drawings, the arrow UP indicates upward in a vertical direction, the arrow WI indicates the seat width direction, and the arrow FB indicates the seat front-rear direction.

Overall Configuration

Figure 7:
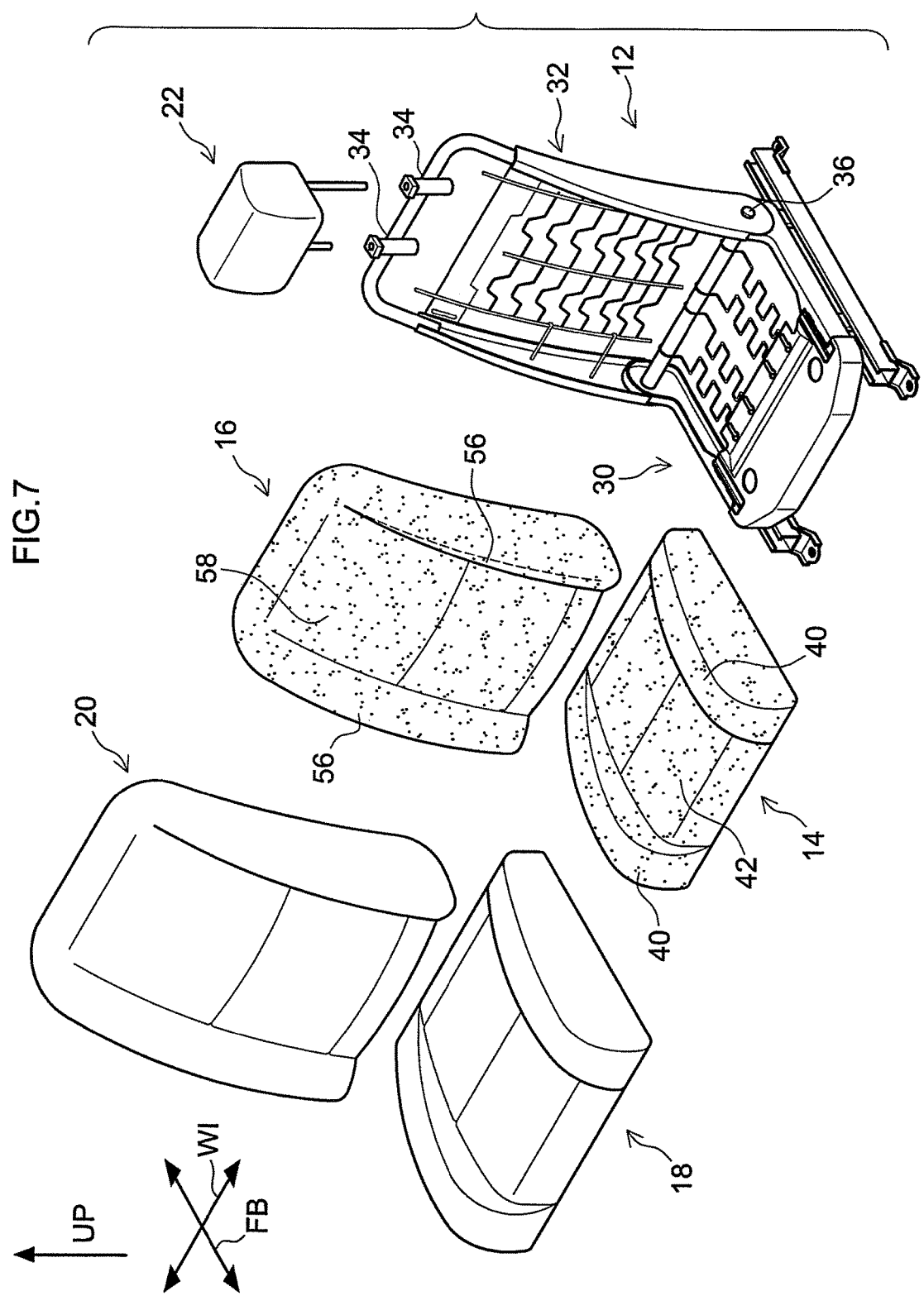
FIG. 7 is an exploded perspective view of a seat according to an exemplary embodiment of the present invention.
Figure 8:
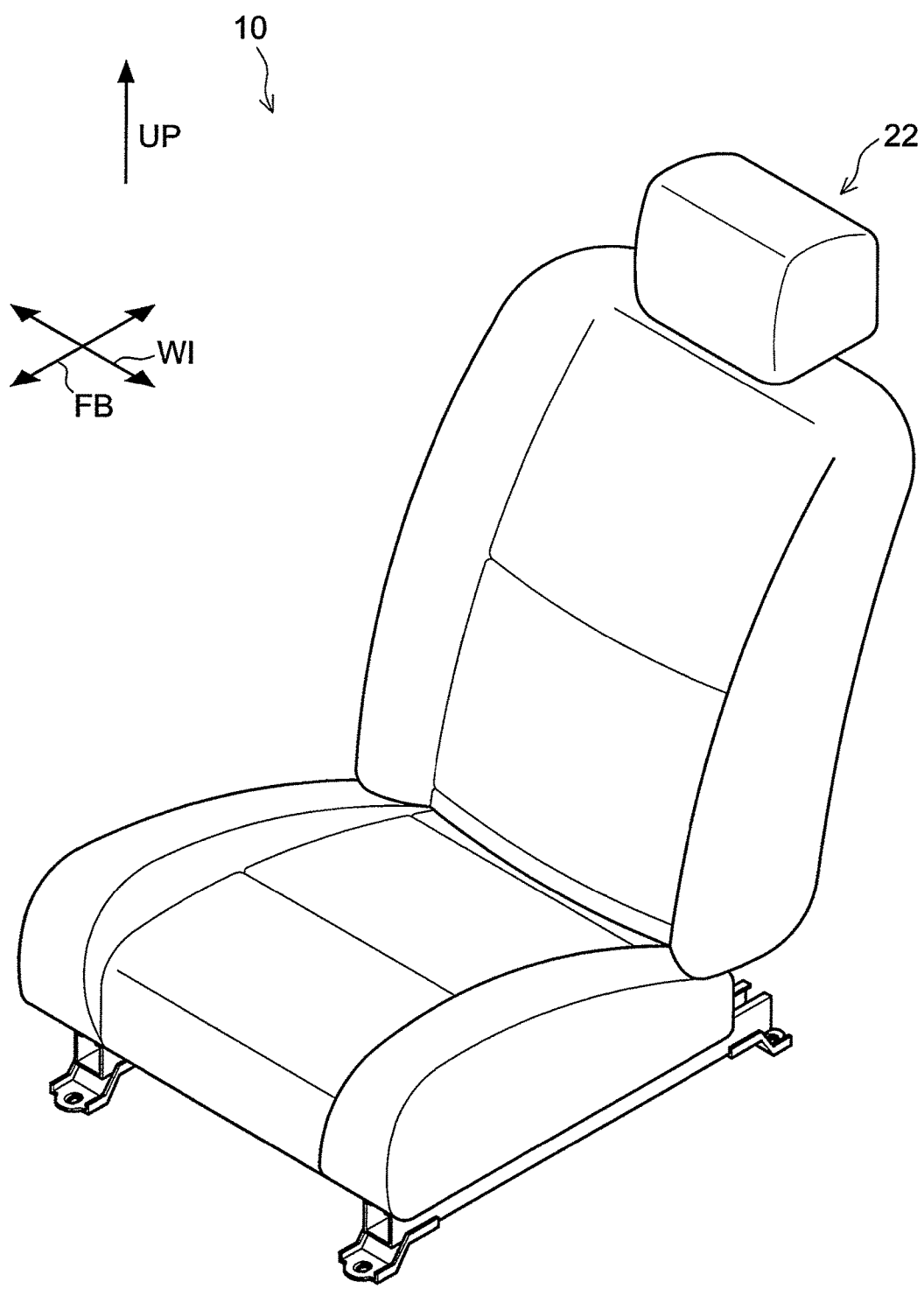
FIG. 8 is a perspective view of a seat according to an exemplary embodiment of the present invention.

A vehicle seat 10 (referred to below simply as "seat 10") is a seat employed in the front row of a vehicle, as illustrated in FIG. 8. As illustrated in FIG. 7, the seat 10 includes a frame 12 serving as a support body, a seat cushion 14 that is attached to the frame 12 and supports the buttocks of a seated occupant, for example, a seatback 16 that is attached to the frame 12 and supports the back, lumbar region, and the like of the seated occupant, and a headrest 22 that is attached to the frame 12 and supports the head of the seated occupant.

The seat 10 also includes a cushion cover 18 that covers the seat cushion 14, and a back cover 20 that covers the seatback 16.

The frame 12 includes a cushion frame 30 that supports the seat cushion 14, a back frame 32 that supports the seatback 16, and headrest brackets 34, serving as an example of a pair of support members that support the headrest 22.

A rear end side in a seat front-rear direction of the cushion frame 30 is coupled to a lower end side in a vertical direction of the back frame 32 by a shaft member 36 extending in a seat width direction. The back frame 32 turns about the center of rotation of the shaft member 36.

Two headrest brackets 34 are provided, attached to an upper end side of the back frame 32, and separated in the seat width direction. The headrest brackets 34 are configured in tube shapes extending in the up-down direction, and both end sides of a stay member 60 of the headrest 22 are inserted into the headrest brackets 34. The headrest 22 is thereby supported by the frame 12 (the headrest brackets 34). Note that the headrest 22 will be described in detail later.

The seat cushion 14 is formed by foam molding a foamable urethane resin, and includes a pair of side support portions 40 that suppress the seated occupant from sliding in the seat width direction, and a main portion 42 that is disposed between the pair of side support portions 40.

The seatback 16 is formed by foam molding a foamable urethane resin, and includes a pair of side support portions 56 that suppress the upper body of the seated occupant from sliding in the seat width direction, and a main portion 58 that is disposed between the pair of side support portions 56.

Explanation Follows Regarding Configuration of the Headrest 22.

Figure 6:
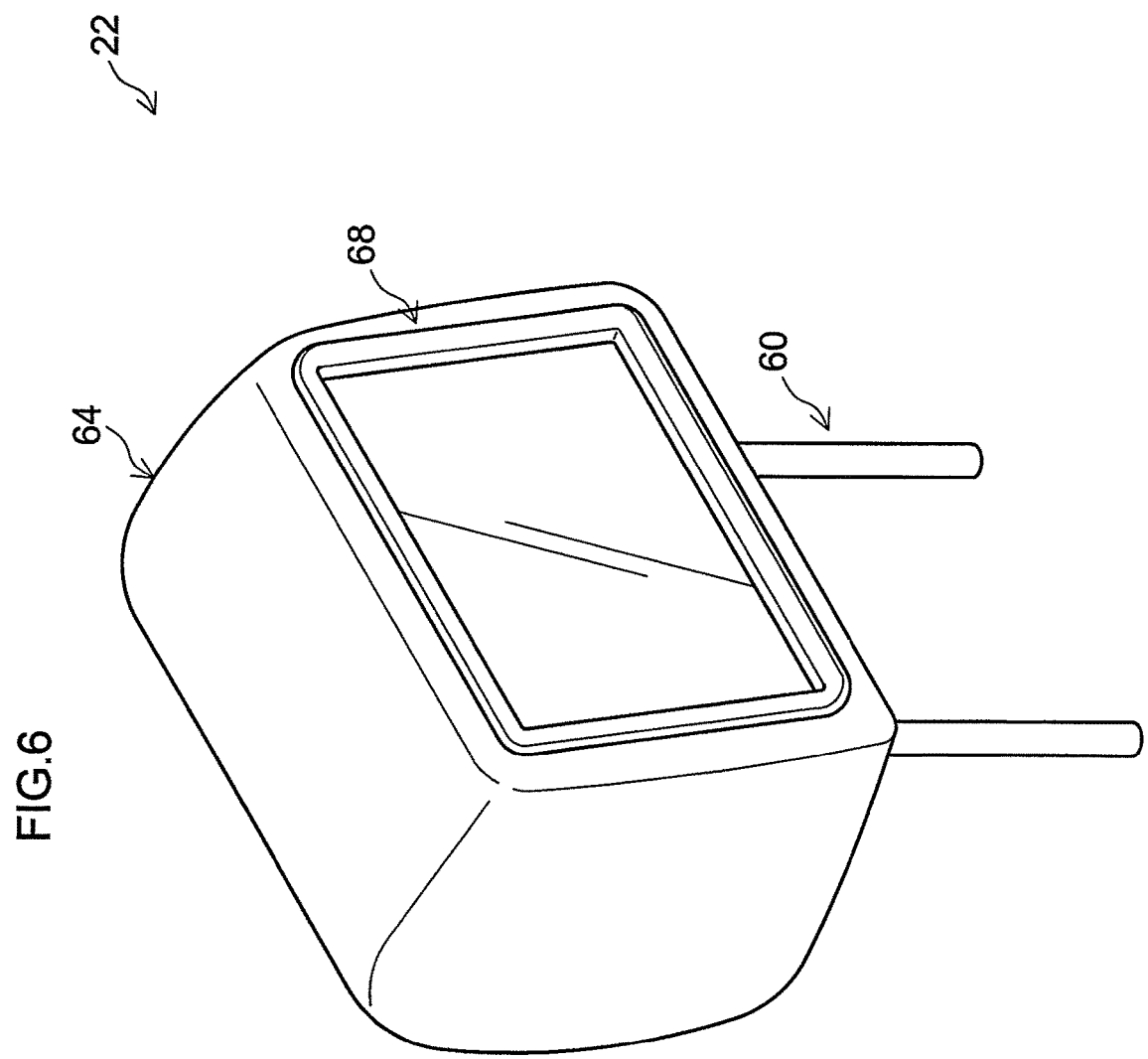
FIG. 6 is a perspective view illustrating a headrest according to an exemplary embodiment of the present invention.

As illustrated in FIG. 5 and FIG. 6, the headrest 22 includes the stay member 60 that is formed by bending a pipe, a pad member 62 that is attached to the stay member 60 and that supports the head of the occupant, a pad cover 64 that is an example of a covering member covering the pad member 62, and a headrest box 66 (hereafter simply referred to as "box 66") that is an example of an attachment member to which a display device 68 that displays images may be attached.

Stay Member

As illustrated in FIG. 5, the stay member 60 includes a pair of extending portions 60A that are formed by bending a pipe, that are bent partway and extended downward at a separation to each other in the seat width direction, and a coupling portion 60B that extends in the seat width direction and couples together upper ends of the pair of extending portions 60A.

The headrest 22 is attached to the frame 12 (see FIG. 7) by inserting lower side portions of the extending portions 60A into the headrest brackets 34 (see FIG. 7).

Pad Member

The pad member 62 is formed by foam molding a foamable urethane resin, and, as illustrated in FIG. 5, the external profile thereof is a substantially rectangular box shape extending in the seat width direction. The pad member 62 is formed with a support face portion 62A that faces forward and supports the head of the occupant, and a recessed portion 62B that is an example of a housing portion open to the rear side and that houses an upper side portion of the stay member 60 and a portion of the box 66.

The pad member 62 is supported by the stay member 60 at the upper side portion of the stay member 60 that is housed (disposed) in the recessed portion 62B of the pad member 62 by a bracket or the like, not illustrated in the drawings.

Pad Cover

As illustrated in FIG. 5, the pad cover 64 includes a head contacting cloth 64A that contacts the head of the occupant and covers the support face portion 62A of the pad member 62, an upper cloth 64B that extends rearward from the head contacting cloth 64A with a cloth face facing upward, one side cloth 64C that extends to the rear from the head contacting cloth 64A with a cloth face facing one side (the left side in FIG. 5), another side cloth 64D that extends to the rear from the head contacting cloth 64A with a cloth face facing the other side (the right side in FIG. 5), and a lower cloth 64E that extends to the rear from the head contacting cloth 64A with a cloth face facing downward.

As illustrated in FIG. 4, the upper cloth 64B and the one side cloth 64C, the upper cloth 64B and the other side cloth 64D, the lower cloth 64E and the one side cloth 64C, and the lower cloth 64E and the other side cloth 64D are respectively joined by stitched portions 65 formed by bringing together and stitching, for example, surfaces at mutual end sides thereof.

As illustrated in FIG. 5, the lower cloth 64E is formed with circular through holes 70A through which the extending portions 60A of the stay member 60 are respectively inserted, and a rectangular through hole 70B though which a harness, not illustrated in the drawings, of the display device 68 is inserted.

Headrest Box

The box 66 is supported by the stay member 60 using a bracket or the like, not illustrated in the drawings, and, as illustrated in FIG. 5, is formed in a box shape including an opening portion 72 that is open to the rear side. The box 66 includes a bottom plate 66A, an upper plate 66B with a plate face facing upward, one side plate 66C with a plate face facing the one side (the left side in FIG. 5), another side plate 66D with a plate face facing the other side (the right side in the FIG. 5), and a lower plate 66E with a plate face facing downward.

As illustrated in FIG. 3A and FIG. 3B, the box 66 is also formed with flanges 74, that are an example of folded-over portions that are folded over toward the left side in the drawings (the seat front side) from respective edges 72A of the upper plate 66B, the side plates 66C and 66D, and the lower plate 66E. The edges 72A configure the opening portion 72 and the flanges 74 increase the rigidity of the opening portion 72.

In this configuration, as illustrated in FIG. 2B, in a state in which the box 66 is housed in the recessed portion 62B of the pad member 62, the flanges 74 of the box 66 are disposed further to the rear side than a rear end portion of the pad member 62. Furthermore, a rear portion of the upper cloth 64B, a rear portion of the one side cloth 64C, a rear portion of the other side cloth 64D, and a rear portion of the lower cloth 64E of the pad cover 64 are supported by the front faces of the flanges 74 (support of the rear portion of the one side cloth 64C and the rear portion of the other side cloth 64D is not illustrated in the drawings).

As illustrated in FIG. 5, slits 76, that are an example of cutouts, extending from each of the edges 72A toward s side of the bottom plate 66A are respectively formed to each of corner portions, that are formed by the one side plate 66C and the lower side plate 66E, by the other side plate 66D and the lower side plate 66E, by the one side plate 66C and the upper plate 66B, and by the other side plate 66D and the upper plate 66B. As illustrated in FIG. 4, rear side portions of the stitched portions 65 previously described are disposed in the slits 76.

As illustrated in FIG. 3A and FIG. 5, a pair of circular shaped recessed portions 78, that are an example of engaged portions, are formed to the upper plate 66B. A pair of circular column projections 68A (see FIG. 5), that are an example of engagement portions, are formed to an upper portion of the display device 68 and are inserted into the pair of recessed portions 78. The pair of circular column projections 68A and the pair of recessed portions 78 are respectively disposed in a row along the seat width direction.

As illustrated in FIG. 3A and FIG. 5, the lower plate 66E is formed with a pair of communication holes 80 that are in communication with a pair of attachment holes 68B formed to a lower portion of the display device 68. The pair of attachment holes 68B and the pair of communication holes 80 are respectively disposed in a row along the seat width direction.

Operation of Relevant Portion Configuration

Explanation follows regarding operation of relevant portion configuration, with comparison between the present exemplary embodiment and a headrest 200 according to a Comparative Example.

Figure 9:
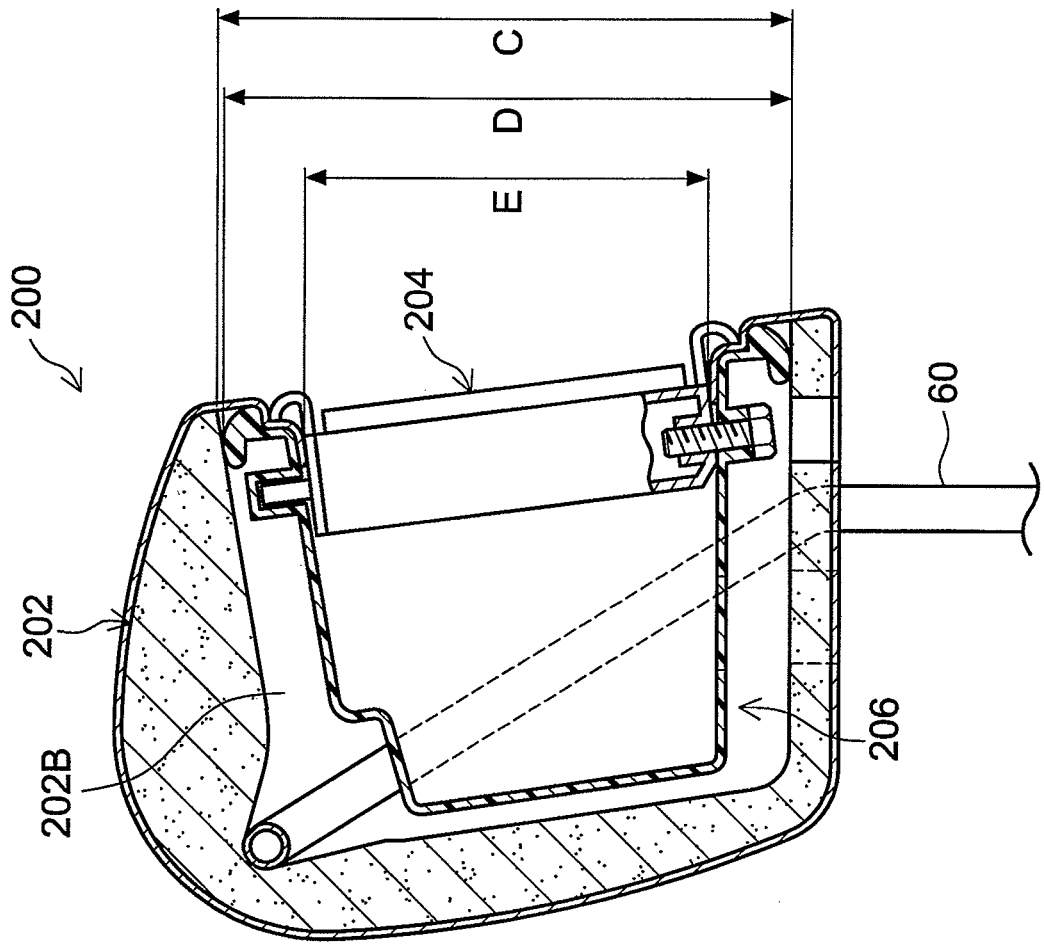
FIG. 9 is cross-section illustrating a headrest according to a Comparative Example to an exemplary embodiment of the present invention.

Explanation first follows regarding the headrest 200 according to the Comparative Example. As illustrated in FIG. 9, a pad member 202 of the headrest 200 of the Comparative Example is formed with a recessed portion 202B that is open to the rear side. A box 206, to which a display device 204 is attachable, is entirely housed inside the recessed portion 202B. A dimension in an up-down direction of the box 206 (dimension D in FIG. 9) is accordingly smaller than a dimension in an up-down direction of opening edges of the recessed portion 202B (dimension C in FIG. 9). A dimension in an up-down direction of the display device 204 (dimension E in FIG. 9) is moreover smaller than the up-down direction dimension of box 206. A similar configuration also applies in the width direction.

However, in the headrest 22 of the present exemplary embodiment, as previously described and as illustrated in FIG. 2B, the flanges 74 of the opening portion 72 of the box 66 are disposed further to the rear than the pad member 62. A dimension in an up-down direction of the box 66 (dimension H in FIG. 2(B)) can accordingly be made larger than a dimension in an up-down direction of the opening edges of the recessed portion 62B (dimension G in FIG. 2(B)). A dimension in an up-down direction of the display device 68 (dimension J in FIG. 2B) is accordingly larger than the up-down direction dimension of the display device 204 (dimension E in FIG. 9) attached to the headrest 200 according to the Comparative Example. A similar configuration also applies in the width direction.

Explanation follows regarding an attachment process for attaching the display device 68 to the headrest 22.

As illustrated in FIG. 1A, a worker (not illustrated in the drawings) first tilts the display device 68 with respect to the vertical direction as viewed along the seat front-rear direction, and inserts leading ends of the circular column projections 68A of the display device 68 into the circular shaped recessed portions 78 of the box 66.

As illustrated in FIG. 1B and FIG. 2A, the worker then pushes a lower end portion of the display device 68 inward toward the box 66 side. Specifically, the worker pushes the lower end portion of the display device 68 inward toward the box 66 side by rotational movement of the lower end portion centered about the circular column projections 68A of the display device 68, as viewed along the seat front-rear direction. The display device 68 is thereby moved to an attachment position in the box 66, placing the attachment holes 68B of the display device 68 in communication with the communication holes 80 of the box 66.

Note that as illustrated in FIG. 5, the slits 76 are respectively formed at the corner portions formed by the one side plate 66C and the lower plate 66E and formed by the other side plate 66D and the lower plate 66E. When the lower side portion of the display device 68 is pushed into the box 66, the display device 68 accordingly moves to the attachment position due to flexing of the lower plate 66E.

Next, as illustrated in FIG. 2B, bolts 82 are inserted through the communication holes 80 and fastened to the attachment holes 68B. The display device 68 is accordingly attached to the box 66.

As described above, the flanges 74 of the opening portion 72 of the box 66 are disposed further to the rear side than the pad member 62. This enables the size of the flanges 74 and the opening portion 72 to be made larger compared to the headrest 200 according to the Comparative Example in which the entire box 206 is housed inside the recessed portion 202B of the pad member 202, whereby a large display device 68 can be attachable to the headrest 22.

Furthermore, the respective rear portions of the upper cloth 64B, the one side cloth 64C, the other side cloth 64D, and the lower cloth 64E of the pad cover 64 are supported by the front faces of the flanges 74. The flanges 74, that increase the rigidity of the opening portion 72, also support portions of the pad cover 64 thereby enabling an increase in the number of components to be suppressed.

Moreover, the slits 76 are formed at the corner portions formed by the one side plate 66C and the lower plate 66E and formed by the other side plate 66D and the lower plate 66E respectively. When the lower side portion of the display device 68 is pushed into the box 66, the display device 68 moves to the attachment position due to flexing of the lower plate 66E. Forming the slits 76 and flexing the lower plate 66E in this way enables the display device 68 to be easily attached to the box 66.

Moreover, disposing (containing) the rear sides of the stitched portions 65 of the pad cover 64 inside the slits 76 enables the external appearance of the headrest 22 to be improved.

Note that a specific exemplary embodiment of the present invention has been described in detail above, however the present invention is not limited to such an exemplary embodiment. It would be obvious to a practitioner skilled in the art that various embodiments other than that above may be implemented within the scope of the present invention. For example, although not mentioned specifically in the exemplary embodiment described above, there is no limitation for the present invention to be employed to a front row vehicle seat, as long as the seat 10 is provided with the headrest 22.

Moreover, although the slits 76 are formed to the corner portions and the lower plate 66E is flexed in the exemplary embodiment described above, slits may be formed in other locations to flex the lower side plate 66E.

What is claimed is:

1. A headrest comprising:
   a pad member including a recess shaped housing portion open to a rear side when the headrest is assembled to a vehicle seat and being a resilient body that supports the head of an occupant; and
   an attachment member having a portion housed in the housing portion, being formed with an opening portion for attaching a display device to, and further having an outer peripheral portion of the opening portion that is disposed further to the rear side than the pad member,
   wherein the attachment member is formed in a box shape open at the opening portion, and includes a bottom plate, an upper plate with a plate face facing upward, one side plate with a plate face facing one side, another side plate with a plate face facing the other side, and a lower plate with a plate face facing downward,
   the attachment member comprises a slit that enables flexing of the lower plate,
   the slit is disposed at a corner portion formed by the lower plate with one of the one side plate and the other side, and
   an end of the slit is open at the opening portion of the attachment member such that the outer peripheral portion of the opening portion of the attachment member is separated by the slit,
   wherein the pad member comprises a lower bottom portion at a lower side of the recess shaped housing portion; and a covering member covering the pad member, wherein at least a portion of the covering member is disposed in the slit.

2. The headrest of claim 1,
   wherein, the outer peripheral portion is a folded-over portion that is folded over from an edge configuring the opening portion of the attachment member, and that supports a portion of the covering member at the folded-over portion.

3. The headrest of claim 1,
   wherein:
   the upper plate is formed with an engaged portion that is engaged by an engagement portion formed to an upper portion of the display device, and
   the lower plate is formed with a communication hole that is in communication with an attachment hole formed to a lower portion of the display device.

4. A vehicle seat comprising:
   a frame that is a support body;
   a seatback that supports the back of an occupant, and that is attached to the frame;
   the headrest of claim 1 that supports the head of the occupant, and that is attached to the frame; and
   a seat cushion that supports the buttocks of the occupant, and that is attached to the frame.

5. The headrest of claim 1, wherein:
   a lower cloth of the covering member covers the lower bottom portion of the pad member from a lower side of the lower bottom portion, and
   the lower plate of the attachment member is disposed above the lower bottom portion of the pad member and the lower cloth of the covering member.

* * * * *